United States Patent

Brown

[11] 3,919,631
[45] Nov. 11, 1975

[54] LEADLESS PROBE

[76] Inventor: Richard D. Brown, P.O. Box 264, 1730 Yellow Fir Road, Tillamook, Oreg. 97141

[22] Filed: July 5, 1973

[21] Appl. No.: 376,540

[52] U.S. Cl. ............... 324/51; 324/65 P; 324/133; 325/363; 250/338
[51] Int. Cl.² ............................... G01R 31/02
[58] Field of Search .................. 324/51, 53, 133

[56] References Cited

UNITED STATES PATENTS

| | | | |
|---|---|---|---|
| 2,474,073 | 6/1949 | Sundt | 324/17 |
| 2,595,623 | 5/1952 | Yonkers | 324/51 |
| 2,901,694 | 8/1959 | Lewis | 324/51 UX |
| 3,259,841 | 7/1966 | Proctor et al. | 324/51 X |
| 3,283,244 | 11/1966 | Proctor et al. | 324/51 X |
| 3,284,707 | 11/1966 | Clinton | 324/51 X |
| 3,328,684 | 6/1967 | Dorris | 324/51 |
| 3,437,928 | 4/1969 | Baker et al. | 324/133 |
| 3,740,644 | 6/1973 | Schag et al. | 324/51 X |

FOREIGN PATENTS OR APPLICATIONS

| | | | |
|---|---|---|---|
| 1,072,822 | 6/1967 | United Kingdom | 324/17 |
| 1,236,403 | 6/1960 | France | 324/51 |

OTHER PUBLICATIONS

Adsmond et al. Continuity Tester, IBM Technical Disclosure Bulletin, Sept. 1965, p. 525.

*Primary Examiner*—Stanley T. Krawczewicz
*Attorney, Agent, or Firm*—Klarquist, Sparkman, Campbell, Leigh, Hall & Whinston

[57] ABSTRACT

A self-contained continuity checker is hand-held and includes batteries for placing the conductive exterior of a probe at a voltage capable of actuating an amplifier within the probe via the probe's input terminal. A circuit is completed through the hand and body of the user and the component being tested. The triggering of the amplifier energizes a light-emitting diode mounted near the probe tip, or a device integral with the probe for supplying an audible output.

2 Claims, 18 Drawing Figures

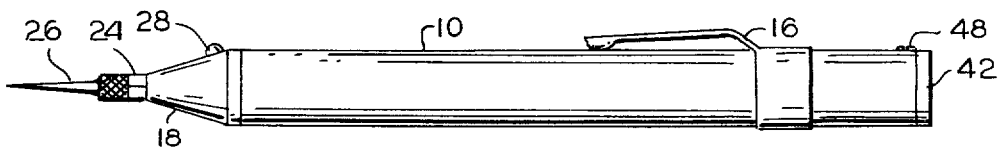
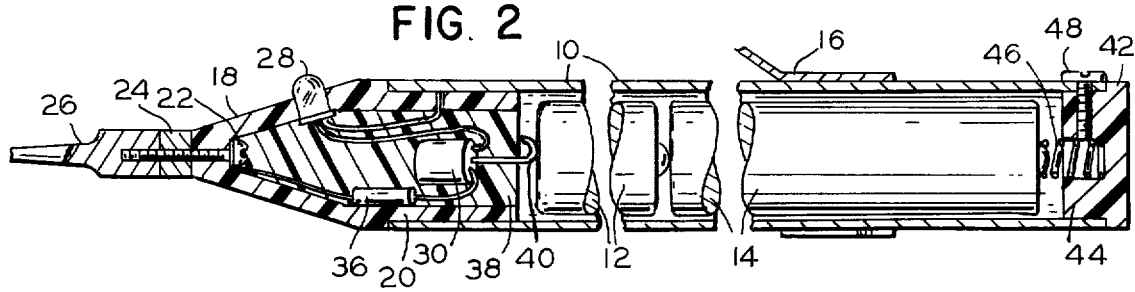
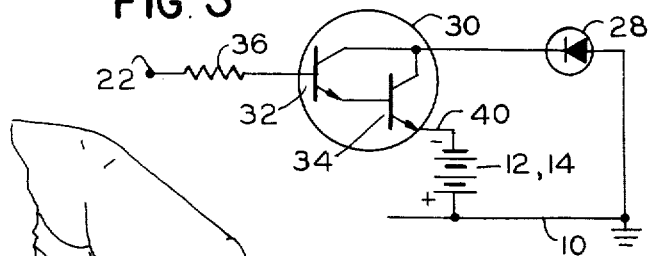
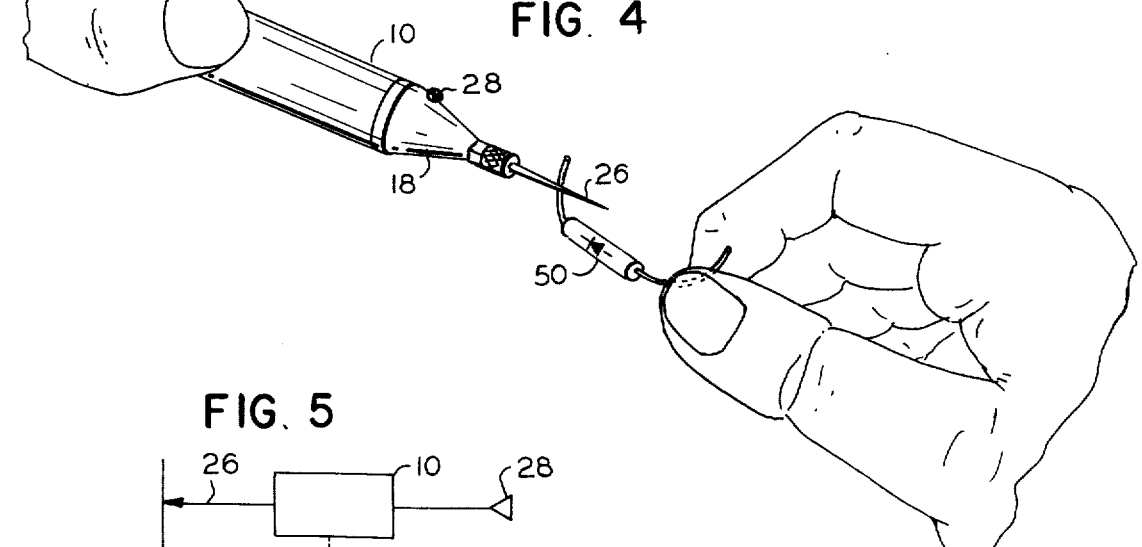
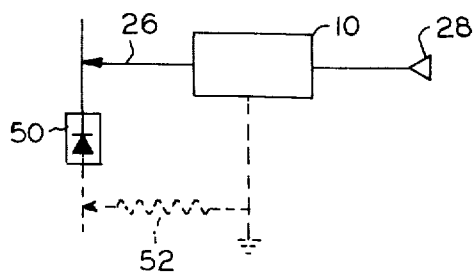

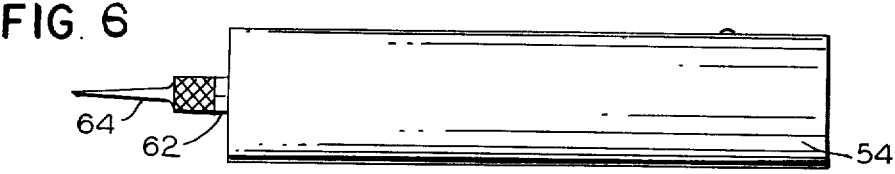
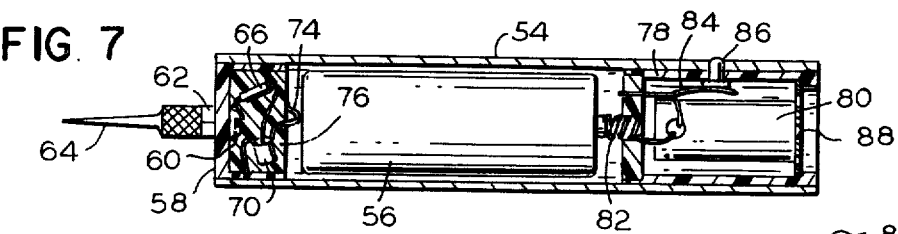
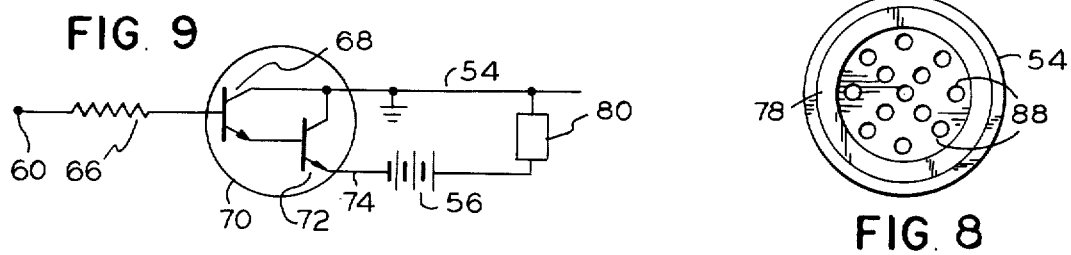
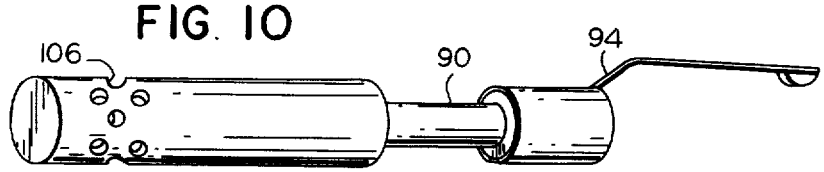
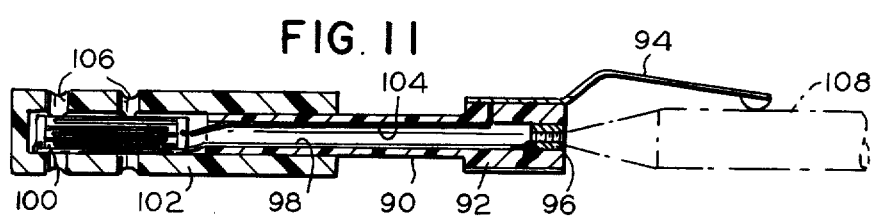

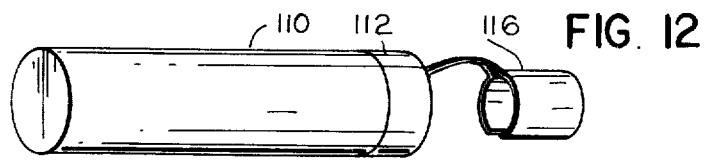
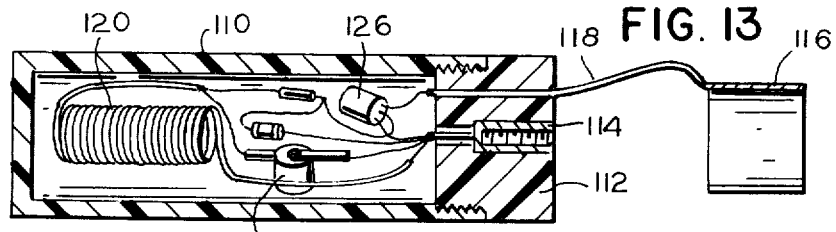
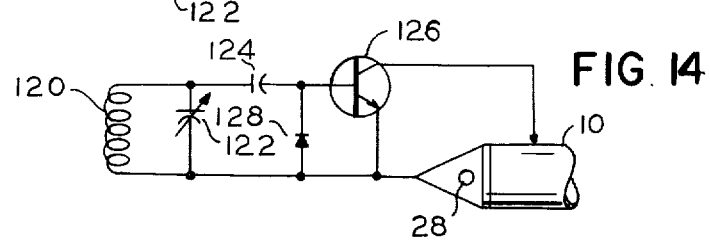
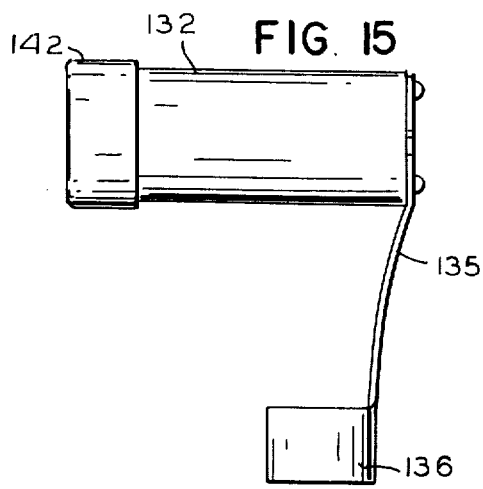
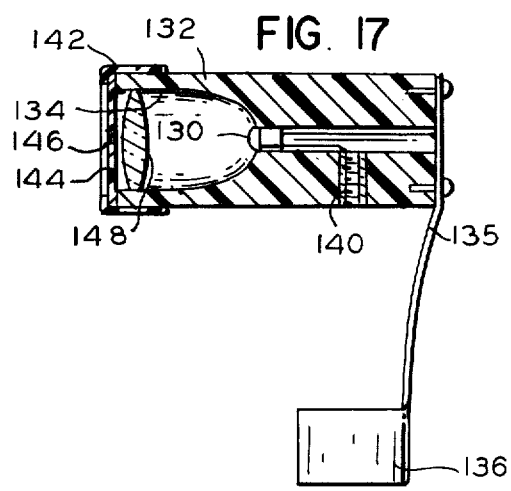
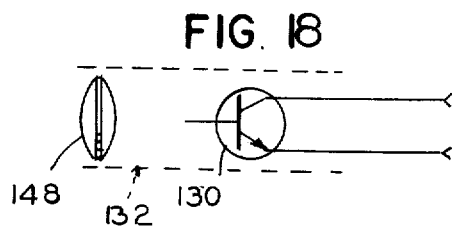
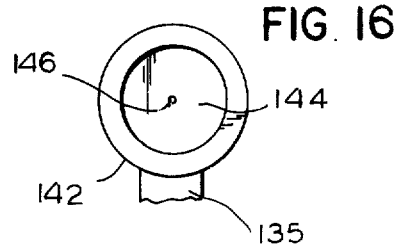

3,919,631

LEADLESS PROBE

BACKGROUND OF THE INVENTION

Continuity tests may be performed with an ohmmeter or similar apparatus employing a pair of leads for application to the unit or wire under test. Equipment of this kind can be unnecessarily cumbersome in simply testing for the continuity of electrical connection between two points. Moreover, the user's attention must be diverted from the unit under test to the ohmmeter indicator scale for ascertaining the condition of continuity. Simpler probes have been developed which provide an output for indicating a continuous circuit, but these probes generally require an additional hanging conductor for returning the circuit of the probe to the circuit of the unit under test, rather than being self-contained.

SUMMARY OF THE INVENTION

According to the present invention a continuity checker probe comprises a probe body adapted to be hand-held and housing therewithin a high input impedance amplifier and a power supply such as one or more batteries. A pair of coupling means for communicating with a unit under test comprise a conductive exterior for the probe body which makes electrical connection with the hand of the user, and a connecting member suitably screw threaded and located at the end of the probe for removably receiving a probe tip or the like. One of the pair of coupling means is coupled to the input of said amplifier, while a second of the coupling means is coupled to said power supply for placing the latter at a voltage which, if applied to the first coupling means, would drive said amplifier and actuate an output means thereof. Such output means is suitably a light-emitting device, located adjacent the probe tip where an output therefrom is easily observed by the user without taking his attention from the unit under test, or a unit for producing an audible output. The probe thus provided is completely portable and may be carried in a pocket in the manner of a pen-light without requiring the use of dangling wires. The output indication, whether visual or audible, does not take the user's attention away from the item being tested.

The probe is adapted for a wide variety of uses, such as checking cables, circuit boards, diodes, transistors, capacitors, fuses, transformers, and other components. It may also be employed as a logic probe for detecting the presence or absence of desired voltage levels. Furthermore, the probe is suitably provided with a choice of adapters fitting over the end thereof whereby the probe can be used as a detector of moisture, RF radiation, infrared radiation, and the like.

It is accordingly an object of the present invention to provide an improved leadless probe for checking continuity.

It is another object of the present invention to provide a self-contained probe for checking continuity and the like and which integrally includes output means of such a nature that the attention of the user need not be distracted from a unit under test.

It is another object of the present invention to provide an improved, simplified, and self-contained device for testing components such as semiconductor devices, fuses, transformers, printed circuit boards, and the like.

It is a further object of the present invention to provide an improved probe adapted to be used as a detector of electromagnetic radiation.

It is a further object of the present invention to provide an improved probe adapted for detecting levels of moisture, temperature, and the like.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view of a probe according to the present invention;

FIG. 2 is a longitudinal cross section of the FIG. 1 probe;

FIG. 3 is a schematic diagram of circuitry within the FIG. 1 probe;

FIG. 4 illustrates use of a probe according to the present invention;

FIG. 5 is a simplified schematic diagram illustrating the over-all circuit achieved;

FIG. 6 is a side view of a second embodiment of the probe according to the present invention;

FIG. 7 is a longitudinal cross section of the FIG. 6 probe;

FIG. 8 is an end view of the FIG. 6 probe;

FIG. 9 is a schematic diagram of circuitry within the FIG. 6 probe;

FIG. 10 is a perspective view of a first adapter according to the present invention for measuring moisture;

FIG. 11 is a longitudinal cross section of the FIG. 10 adapter;

FIG. 12 is a perspective view of an adapter for detecting RF radiation;

FIG. 13 is a longitudinal cross section of the FIG. 12 adapter;

FIG. 14 is a schematic diagram illustrating the circuit of the FIG. 12 adapter;

FIG. 15 is a side view of an adapter according to the present invention for detecting infrared radiation;

FIG. 16 is an end view of the FIG. 15 adapter;

FIG. 17 is a longitudinal cross section of the FIG. 15 adapter; and

FIG. 18 is a schematic diagram illustrating interior elements of the FIG. 15 adapter.

DETAILED DESCRIPTION

Referring to the drawings, and particularly to FIGS. 1, 2 and 3 illustrating a first embodiment of the present invention, a continuity checker or probe comprises a hollow cylindrical body 10 formed of metal to provide a conductive exterior. The body 10 is suitably the same size as a so-called "pen-light" and receives batteries 12 and 14 therewithin and a pocket clip 16 along the exterior thereof. The forward part of the cylinder is closed by a tapered, hollow member 18 formed of plastic having a cylindrical base portion 20 of a diameter for reception within cylindrical body 10. The narrow end of member 18 is provided with a small axial hole for receiving a connecting member in the form of a machine screw 22, inserted from within member 18, while a mating nut 24 engages the machine screw at the exterior tip of member 18 for holding the machine screw.

The conductive exterior of the probe body and the machine screw 22 form a pair of coupling means connecting to the interior of the probe. The threaded shank of the machine screw extends beyond nut 24 for suitably engaging a metal probe tip 26 having mating threads.

The output indication for the first embodiment of the probe according to the present invention is supplied by a light-emitting diode 28 suitably extending through a matching aperture in the tapered side of member 18 and secured in position. The light-emitting diode is driven from a transistor amplifier 30 which may comprise a Darlington circuit including a first transistor 32 in driving relation to a second transistor 34. The amplifier is suitably a type 2N5307. The light-emitting diode 28, suitably a type TIL209, is connected in series, as shown, between the transistor collector lead and the probe body which is indicated as ground in FIG. 3. A coupling resistor 36 is serially interposed between machine screw or connecting member 22 and the base of transistor 32, this resistor suitably having a value of approximately 200 K ohms, and employed for preventing the application of excessive voltage to the transistor in the event of a direct connection between connecting member 22 and probe body 10. The circuitry as just described is suitably encased in a body of potting compound 38, while lead 40, extending from the emitter of transistor 34, protrudes from the rear surface of the potting material for making contact with the negative or rear terminal of battery 12.

The remote end of body 10 is closed by a removable end cap 42 having a central extension 44 of appropriate diameter for reception within the end of body 10. The cap 42 is suitably formed of plastic, and has an axial bore extending partway through the same for receiving a battery contact spring 46 making connection with the positive terminal of battery 14, while urging the same toward battery 12. A cap retaining screw 48 extends through an aperture in body 10 and is threadably received in a radial direction through portion 44 of the end cap 42. The screw 48 performs the function of securing the end cap 42 to the body 10, as well as the function of completing an electrical connection between contact spring 46 and the body 10. Thus, the batteries 12, 14 are electrically interposed between the emitter of transistor 34 and the conductive exterior of the probe, placing the conductive exterior of the probe at a positive voltage of about three volts with respect to said emitter.

Upon consideration of the circuit of FIG. 3, it will be seen that completion of the connection between body 10 and connection member 22 will cause the transistors to conduct and energize light-emitting diode 28. It will be noted the same battery or power supply 12, 14 is employed both for providing the input to the device, and for empowering the transistor amplifier driving the light-emitting diode.

Use of the device is illustrated in FIGS. 4 and 5. In FIG. 4, the probe device according to the present invention is employed for testing the continuity in the forward direction of a diode 50. One lead of the diode is grasped in one hand, while the probe is held in the other so as to make connection between probe tip 26 and the remaining lead of the diode. The polarity of the batteries 12, 14 within the probe is such that the light-emitting diode 28 will light for the polarity of the diode 50 shown, i.e., with the cathode of the diode touching probe tip 26, but will not light if an operative diode under test is reversed. It is noted the illumination of diode 28 is readily noticed by the user without his having to divert his attention materially. The complete circuit is fully illustrated schematically in FIG. 5 where the resistance of the human body is indicated at 52. The current flows from the batteries in probe 10, and through resistance 52, diode 50, and probe tip 26, providing an input to the probe amplifier for operating probe output indicator 28. The resistance of the human body between hands is approximately 200 K ohms, and the input impedance of the Darlington circuit amplifier is quite high making possible the full actuation of the output indicator in this manner. Exterior leads and connections to the probe are eliminated making the same entirely self-contained and easily portable. Since the probe is about the size of a pen or pen-light, the same is easily carried in the user's pocket when not in use.

The probe according to the present invention has a great many uses in addition to testing the continuity and polarity of diodes. Thus, cable wires are easily traced with the present device and such components as transformers, silicon transistors, photocells, electron tube heaters, relays, fuses, and the like, are easily tested. In checking cables, one cable lead is grasped in the fingers of one hand, and the probe tip is employed for finding the remaining end of the same lead. In the event a cable is to be tested where both the ends of the cable are not readily available, one or more shorts or diodes may be connected between selected leads at the remote end of the cable, and the probe according to the present invention may be employed for ascertaining the identity of the various leads at the forward end of the cable. The probe according to the present invention may be employed for checking circuit board continuity. The circuit board is grasped in one hand at system common or the like or contact is made therewith by a handheld instrument such as the metal shank of a small screwdriver, clip, or the like. The probe is utilized for making tip connection with various portions of the circuit. The probe will indicate continuity up to resistances in the unit or component being tested of approximately one megohm.

The probe may be employed for checking capacitors by holding one lead of the capacitor in the manner illustrated in FIG. 4 and touching the probe tip to the remaining lead. The light-emitting diode 28 should turn on briefly. Now, the capacitor leads may be reversed and again the light should become illuminated for a brief period of time depending upon the value of the capacitor. For a value of 0.25 microfarads, the light will remain on for approximately three seconds. If the light-emitting diode continues to provide a light output, the capacitor is shorted, and if the light-emitting diode fails to light altogether in the instance of a capacitor of reasonable capacitance value, the capacitor is open.

As long as the circuit being checked is at a safe voltage value, the probe according to the present invention may be employed to indicate the presence of voltages. When a finger is held to the system common, and the probe tip is employed to make contact with a circuit under test, negative voltage levels will prevent output while positive voltages will cause an output indication from the probe light-emitting diode. If the circuit under test has a low impedance, it may be necessary to insert a capacitor in series with the probe tip.

A second probe according to the present invention is illustrated in FIGS. 6 through 9 and includes a hollow cylindrical probe body 54 formed of metal to provide a conductive exterior. A battery 56 is received therewithin. A first cup-shaped plastic member 58 is received and secured within the forward end of body 54, and a machine screw 60 is inserted through an axial hole in the end of member 58 to provide a connecting means. A nut 62 secures the machine screw in place, with the latter extending beyond the nut for engaging a threaded probe tip 64. The machine screw or connecting means 60 is coupled via resistor 66 to the base of a first transistor 68 of a Darlington amplifier 70. The collectors of transistors 68 and 72 of Darlington amplifier 70 are connected to ground or the body 54 of the probe, while the lead to the emitter 74 of the transistor 72 extends above the surface of the potting compound 76, in which the circuit is encased, for making contact with the negative terminal of battery 56.

A cylindrical plastic housing 78 is slidably received within the remaining end of cylindrical body 54 and supports therewithin an audio output device in the form of a solid state electronic buzzer 80. This buzzer may comprise a vibratory reed energized by a transistor blocking oscillator and driving a small diaphragm for emitting an audible output. This device may comprise a model GA100 miniature electronic buzzer manufactured by Projects Unlimited, Inc., Dayton, Ohio. A first lead of the buzzer 80 is connected to a battery contact spring 82 protruding through the forward end wall of housing 78 for making contact with the positive terminal of battery 76 while urging said battery toward the forward end of the probe. The remaining lead of buzzer 80 is connected to a metal leaf spring member 84 secured in the forward end wall of housing 78 and disposed for urging battery metal cap lock button 86 through matching apertures in housing 78 and probe body 54. The cap lock button 86 is urged outwardly by leaf spring member 84, and longitudinally by battery contact spring 82, whereby the battery cap lock button 86 completes an electrical connection between the buzzer lead and the probe body 54. The button 86 may be urged downwardly through the aperture in body 54, whereby both housing 78 and battery 56 may be removed for replacing the latter. The rear of housing 78 is perforate as indicated at 88 for transmission of sound as may emanate from the buzzer 80.

The function and operation of the probe according to the embodiment of FIGS. 6 through 8 is substantially the same as described for the first embodiment, except a clearly audible output is produced by buzzer 80 to indicate continuity. Again, the probe is hand-held, with the circuit being completed through the body of the user from the battery source to the high impedance input of the amplifier. The conductive exterior of body 54 is in this case connected with the remote side of electronic buzzer 80 from battery 56 as a matter of convenience. However, again, the conductive exterior is provided with the potential capable of energizing the device input through the impedance of the human body and the device under test.

FIGS. 10 and 11 illustrate an adapter for employment with the probe according to the present invention for measuring moisture level. The adapter consists of a hollow plastic tube 90 having an enlarged end 92 onto which a clip 94 is secured for extending in a direction longitudinally away from plastic tube 90. A metal female threaded member 96 is secured in the central bore of the plastic tube, facing in a longitudinally outward direction and is connected by means of a lead 98 to a first set of parallel conductors forming a grid on a small insulated circuit board 100 received within a plastic end cap 102 inserted over tube 90. A second set of parallel conductors, interspersed with the first set, are connected through lead 104 to the aforementioned clip 94. The end cap 102 is perforated as indicated at 106 to allow the entrance of moisture onto small circuit board 100.

The adapter of FIGS. 10 and 11 is received on one end of a probe according to the present invention, for example the probe according to FIGS. 1 through 3, and is illustrated in dashed line at 108 in FIG. 11. Thus, the adapter threadably engages the machine screw 22 of the aforementioned probe in the same manner as the probe tip 26, but with further connection being made by clip 94 to the conductive exterior of the body of the probe. The probe is not then employed as a continuity checker or the like but is instead employed to initiate an output indication in the event of deposition of moisture on the circuit board providing a resistance of less than approximately one megohm.

Another adapter according to the present invention, for converting the probe for the detection of electromagnetic radiation, is illustrated in FIGS. 12, 13 and 14. This adapter includes a cylindrical plastic case 110 provided with a plastic cap 112 threadably received into one end thereof. The plastic cap includes a female threaded member 114 adapted for engaging the aforementioned machine screw 22 of a probe according to the present invention, while a clip 116, extending from an arm 118, supported through cap 112, makes contact with the conductive exterior of such probe.

The case 110 houses a parallel tuned circuit comprising an inductance coil 120 and a capacitor 122. The parallel circuit may be tuned to the RF frequency of radiation it is desired to detect. A coupling capacitor 124 couples one terminal of the parallel tuned circuit to the base of the transistor 126. The remaining terminal of the tuned circuit is connected to the emitter of such transistor and to the female threaded member 114 for making connection with the probe central connecting member. The collector of transistor 126 is connected to arm 118, and a detecting diode 128 is disposed between the base and emitter of transistor 126. The diode detects or rectifies the signal coupled from capacitor 124 for causing transistor 126 to conduct.

Oscillatory currents will be induced in coil 120 when the coil is placed in an RF field of a corresponding frequency, and the net action of the resulting voltage across the tuned circuit is to turn on transistor 126 for at least a portion of the oscillatory voltage waveform. Transistor 126, which is empowered at its collector from batteries in the probe, will then provide a relatively positive input at its emitter for turning on the transistor amplifier in the probe and causing illumination of light-emitting diode 28. The probe with this attachment is useful in detecting the presence of RF radiation, tracing standing waves, and the like. This adapter, as any of the adapters illustrated herein, may be employed with the probe of FIGS. 1–3, or, alternatively, with the probe of FIGS. 6–9.

A further adapter according to the present invention for converting a probe according to the present invention (e.g. the probe of FIGS. 1 through 3) for the detection of electromagnetic radiation is illustrated in FIGS. 15 through 18. In this instance, the adapter includes an infrared sensitive photocell, suitably a Fairchild type FPT100 cell which is peaked at 6000 angstroms, this photocell being numbered 130. Cell 130 is housed in a cylindrical plastic body 132 having a concave recess 134 at one end thereof extending about halfway through the body and ending in an axial aperture within which cell 130 is secured. The axial aperture extends through the remaining length of body 132 for receiving leads of cell 130, one of such leads connecting to arm 135 secured at right angles to the remote end of the body and carrying clip 136 which is adapted to receive the main body of the probe. The remaining lead of cell 130 connects to a female threaded member 140 extending through and secured in the side wall of body 132 in coaxial alignment with clip 136 for receiving machine screw 22 of the probe.

The forward end of adapter body 132 is provided with a cap 142 for holding an attenuator disc 144 in place, such disc having a central aperture 146 through which radiation may pass. Inside the attenuator disc, a lens 148 is secured within recess 134 and is employed for focusing radiation upon the cell 130. As appears, the adapter of FIGS. 15 through 18 fits upon the probe at right angles to the axis thereof and may be employed for detecting infrared radiation, i.e., associated with the heat emitted by a particular object. The attenuator disc may be selected for producing sufficient conduction through cell 130 for causing illumination of the light-emitting diode of the probe when a given temperature is reached. Other temperature-sensitive means may be employed in place of cell 130, and alternatively cell 130 may be replaced by means sensitive to radiation in a different frequency range, i.e., for detecting a light beam.

Although, in the specific embodiments, probes according to the present invention have employed the outer casing of the probe body as a conductive exterior to which a source of voltage is coupled for providing energization of the probe amplifier via the probe tip, it is apparent the roles of the body conductive exterior and the probe tip could be interchanged. Thus, the probe tip may be supplied with a voltage sufficient for operating the probe amplifier, and the input of the amplifier may be connected to the conductive exterior of the probe body. In either case, the probe does not require external connection when employed for continuity checking, but completes its circuit through the body of the user back to the high impedance input amplifier in the probe. Of course, when the probe is used with one of the adapters herein described, the circuit is completed through the adapter itself, the probe supplying the necessary power for the adapter.

Although the body of the probe according to the present invention is suitably formed of metal to provide said conductive exterior for making contact with the hand of the user, it will be appreciated such conductive exterior can be partial or even constitute a metal member such as a clip or the like supported upon a nonmetal probe body.

While I have described my invention with respect to the manufacture of several different embodiments, it must be realized that the invention permits numerous modifications in arrangement and detail. I therefore claim as my invention all such modifications as come within the true spirit and scope of the appended claims.

I claim:

1. A probe for indicating electrical continuity comprising:
    a hand-held body, said body comprising an outer tubular electrically conductive portion for making electrical connection with the hand of a user;
    an electrical connecting member supported by said body and electrically insulated from said outer tubular electrically conductive portion, said electrical connecting member including a threadably received removable tip connection;
    a high input impedance amplifier housed in said body, said amplifier comprising a Darlington transistor amplifier having an input directly coupled to the electrical connecting member;
    an output means integral with said body and responsive to said amplifier for producing an output;
    and a power supply housed in said body and directly electrically connected to said outer tubular electrically conductive portion, said power supply acting alone to energize said output means through an electrically continuous path, said path including, in electrical series, said power supply means, said outer tubular electrically conductive portion, the hands and body of the user, a device under test, said electrical connecting member, said high impedance amplifier, and said output means, whereby the electrical continuity of said device under test may be indicated.

2. The device of claim 1 further including an adaptor for providing an input to said probe, said adaptor including a contact for making a connection with said electrical connecting member, and a clip member for making contact with the outer tubular electrically conductive portion of said probe, whereby an input to said probe is provided from said adaptor.

* * * * *